(12) United States Patent
Pontes et al.

(10) Patent No.: US 10,938,622 B2
(45) Date of Patent: Mar. 2, 2021

(54) INTERCONNECTION NETWORK FOR INTEGRATED CIRCUIT WITH FAULT DETECTION CIRCUITRY PROVIDED LOCALLY TO AN UPSTREAM LOCATION

(71) Applicant: Arm Limited, Cambridge (GB)

(72) Inventors: Julian Jose Hilgemberg Pontes, Antibes (FR); Andrew David Tune, Dronfield (GB); Sean James Salisbury, Appley Bridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/423,386

(22) Filed: May 28, 2019

(65) Prior Publication Data

US 2019/0379573 A1 Dec. 12, 2019

(30) Foreign Application Priority Data

Jun. 12, 2018 (GB) ...................................... 1809602

(51) Int. Cl.
*H04L 12/24* (2006.01)
*H04L 12/46* (2006.01)

(52) U.S. Cl.
CPC .............. *H04L 41/06* (2013.01); *H04L 12/46* (2013.01)

(58) Field of Classification Search
CPC ..... H04L 41/06; H04L 12/46; H04L 12/4625; H04L 43/0811; H04L 43/062; G06F 11/1004
See application file for complete search history.

(56) References Cited

U.S. PATENT DOCUMENTS 7,549,160 B1 * 6/2009 Podar ...................... G06F 21/10
380/229
8,804,720 B1 * 8/2014 Rainovic ............... H04L 12/185
370/390

(Continued)

OTHER PUBLICATIONS

Combined Search and Examination Report for GB1809602.4 dated Dec. 19, 2018, 6 pages.

*Primary Examiner* — Tejis Daya
(74) *Attorney, Agent, or Firm* — Nixon & Vanderhye P.C.

(57) ABSTRACT

An interconnection network is provided for managing data transfer between a plurality of nodes of an integrated circuit. The interconnection network has at least one transmission path originating from an upstream location of the interconnection network, each transmission path being arranged to transmit data blocks from the upstream location to an associated downstream location within that transmission path. Digest generation circuitry is used to generate digests for data blocks, and fault detection circuitry provided in association with the upstream location is arranged to determine presence of a fault condition in the interconnection network. The digest generation circuitry is arranged to generate an upstream digest for a given data block at the upstream location, and to generate a corresponding downstream digest for the given data block at the associated downstream location. The fault detection circuitry is arranged to receive upstream digests from the upstream location and corresponding downstream digests received via a return path from each downstream location, and to determine presence of the fault condition based on a comparison of each upstream digest with its corresponding downstream digest.

19 Claims, 10 Drawing Sheets

(56) References Cited

U.S. PATENT DOCUMENTS

| | | | | |
|---|---|---|---|---|
| 2007/0071030 A1* | 3/2007 | Lee | .................... | H04L 47/2433 370/468 |
| 2007/0104327 A1* | 5/2007 | Macri | ................... | H04L 1/0061 380/203 |
| 2010/0312986 A1* | 12/2010 | Fujiwara | ............... | H04L 1/0061 711/216 |
| 2011/0320864 A1* | 12/2011 | Gower | ................ | G06F 11/2053 714/6.12 |
| 2011/0320914 A1* | 12/2011 | Alves | ................. | G06F 11/1004 714/770 |
| 2013/0191703 A1* | 7/2013 | Meaney | .................. | G06F 11/10 714/770 |
| 2014/0006912 A1* | 1/2014 | Morikawa | ............. | H03M 13/09 714/807 |
| 2014/0043962 A1* | 2/2014 | Rangan | ................ | H04L 43/106 370/228 |
| 2014/0152456 A1* | 6/2014 | Olson | .................... | E21B 47/12 340/853.2 |
| 2015/0349798 A1* | 12/2015 | Wang | ................. | G06F 11/1068 714/773 |
| 2015/0358211 A1* | 12/2015 | Kumar | ................. | H04L 45/122 370/254 |
| 2016/0378580 A1* | 12/2016 | Ries | ..................... | G06F 11/079 714/819 |
| 2017/0026149 A1* | 1/2017 | Birrittella | ............. | H04L 1/0058 |
| 2017/0054618 A1* | 2/2017 | Kim | ................... | H04L 43/0829 |

* cited by examiner

| ut_id | upstream digest | time out? | ordering information | dst_id |
|---|---|---|---|---|
| 0 | CRC code | 10 : 41 : 53 | | |
| 1 | | | | |
| 2 | | | | |
| 3 | | | | |
| 4 | | | | |
| 5 | | | | |
| 6 | | | | |

| Fault | Example | Detection mechanism |
|---|---|---|
| Corruption | Single or multiple flipped bits in packet | Digests do not match |
| Repetition of data | Same flit transmitted more than once | Digests do not match |
| Deletion of data | Packet never received by intended receiver | Timeout; or destination id mismatch |
| Insertion of data | Unwanted flit added to communication stream | Digests do not match |
| Sequencing error | Packets delivered in incorrect order | Ordering check failure; timeout; or digests do not match |
| Delays | Packet delivery delayed by a finite amount | Timeout |
| Masquerading transmitters | Sender emitting packets which look as if being sent by another sender | Timeout; or digest mismatch (Note that return message will be sent to an unexpected originator or none) |

FIG. 7

INTERCONNECTION NETWORK FOR INTEGRATED CIRCUIT WITH FAULT DETECTION CIRCUITRY PROVIDED LOCALLY TO AN UPSTREAM LOCATION

This application claims priority to GB Patent Application No. 1809602.4 filed Jun. 12, 2018, the entire contents of which are hereby incorporated by reference.

BACKGROUND

Technical Field

The present technique relates to the field of integrated circuits. More particularly it relates to an interconnection network for providing data access between nodes of an integrated circuit.

Technical Background

An integrated circuit, for example a system on chip, may include a number of nodes which may communicate with each other by issuing data blocks. An interconnection network may be provided which manages routing of the data blocks from a given source node of the integrated circuit to a selected destination node. The type of node acting as a source node and the type of node acting as a destination node will depend on the type of transmission taking place. For instance, when performing a transaction between a master device and a slave device, there may be a number of transfers in both directions. By way of example, a request transfer may take place from the master device to the slave device, and for the transmission of the data block(s) forming that request transfer the master device is the source node and the slave device is the destination node. However, the slave device may subsequently provide a read or write response back to the master device, and for the transmission of the data block(s) forming that response transfer the slave device is the source node and the master device is the destination node.

When such interconnection networks are used in target environments that require functional safety, it is desirable to provide a robust mechanism for detecting faults in the transmissions taking place over the interconnection network.

SUMMARY

At least some examples provide an interconnection network for providing data transfer between a plurality of nodes of an integrated circuit, comprising:
at least one transmission path originating from an upstream location of the interconnection network, each transmission path being arranged to transmit data blocks from the upstream location to an associated downstream location within that transmission path;
digest generation circuitry to generate digests for data blocks; and
fault detection circuitry provided in association with the upstream location and arranged to determine presence of a fault condition in the interconnection network; wherein
the digest generation circuitry is arranged to generate an upstream digest for a given data block at the upstream location, and to generate a corresponding downstream digest for the given data block at the associated downstream location; and
the fault detection circuitry is arranged to receive upstream digests from the upstream location and corresponding downstream digests received via a return path from each downstream location, and to determine presence of the fault condition based on a comparison of each upstream digest with its corresponding downstream digest.

At least some other examples provide an interconnection network for providing data transfer between a plurality of nodes of an integrated circuit, comprising:
at least one transmission path means originating from an upstream location of the interconnection network, each transmission path means for transmitting data blocks from the upstream location to an associated downstream location within that transmission path means;
digest generation means for generating digests for data blocks; and fault detection means provided in associated with the upstream location and for determining presence of a fault condition in the interconnection network; wherein
the digest generation means is arranged to generate an upstream digest for a given data block at the upstream location, and to generate a corresponding downstream digest for the given data block at the associated downstream location; and
the fault detection means is arranged to receive upstream digests from the upstream location and corresponding downstream digests received via a return path from each downstream location, and to determine presence of the fault condition based on a comparison of each upstream digest with its corresponding downstream digest.

At least some other examples provide a method for providing data access between nodes of an integrated circuity using an interconnection network comprising at least one transmission path originating from an upstream location of the interconnection network, each transmission path being arranged to transmit data blocks from the upstream location to an associated downstream location within that transmission path, the method comprising:
generating digests for data blocks; and
determining, using fault detection circuitry provided in association with the upstream location, presence of a fault condition in the interconnection network; wherein
the step of generating digests comprises generating an upstream digest for a given data block at the upstream location, and generating a corresponding downstream digest for the given data block at the associated downstream location; and
the determining step comprises receiving digests from the upstream location and receiving corresponding downstream digests via a return path from each downstream location, and determining presence of the fault condition based on a comparison of each upstream digest with its corresponding downstream digest.

At least some other examples provide a computer-implemented method of generating an electronic design file representing a design of an interconnection network for providing data transfer between nodes of an integrated circuit, the method comprising:
in response to design specification data identifying the nodes to be connected by the interconnection network, generating the electronic design file specifying that the interconnection network comprises:
at least one transmission path originating from an upstream location of the interconnection network, each transmission path being arranged to transmit data blocks from the upstream location to an associated downstream location within that transmission path;
digest generation circuitry to generate digests for data blocks; and fault detection circuitry provided in association with the upstream location and arranged to determine presence of a fault condition in the interconnection network; wherein the digest generation circuitry is arranged to generate an upstream digest for a given data block at the upstream location, and to generate a corresponding downstream digest for the given data block at the associated downstream location; and the fault detection circuitry is arranged to receive upstream digests from the upstream location and corresponding downstream digests received via a return path from each downstream location, and to determine presence of the fault condition based on a comparison of each upstream digest with its corresponding downstream digest.

A storage medium may be provided to store a computer program for controlling a data processing apparatus to perform the method for generating the electronic design file discussed above. The storage medium may be a non-transitory storage medium.

Further aspects, features and advantages of the present technique will be apparent from the following description of examples, which is to be read in conjunction with the accompanying drawings.

BRIEF DESCRIPTION OF THE DRAWINGS

FIG. 6 illustrates a tracking table according to an example of the present technique;

FIG. 7 shows an example of some of the different faults which can be detected by the present technique;

DESCRIPTION OF EXAMPLES

Figure 1:
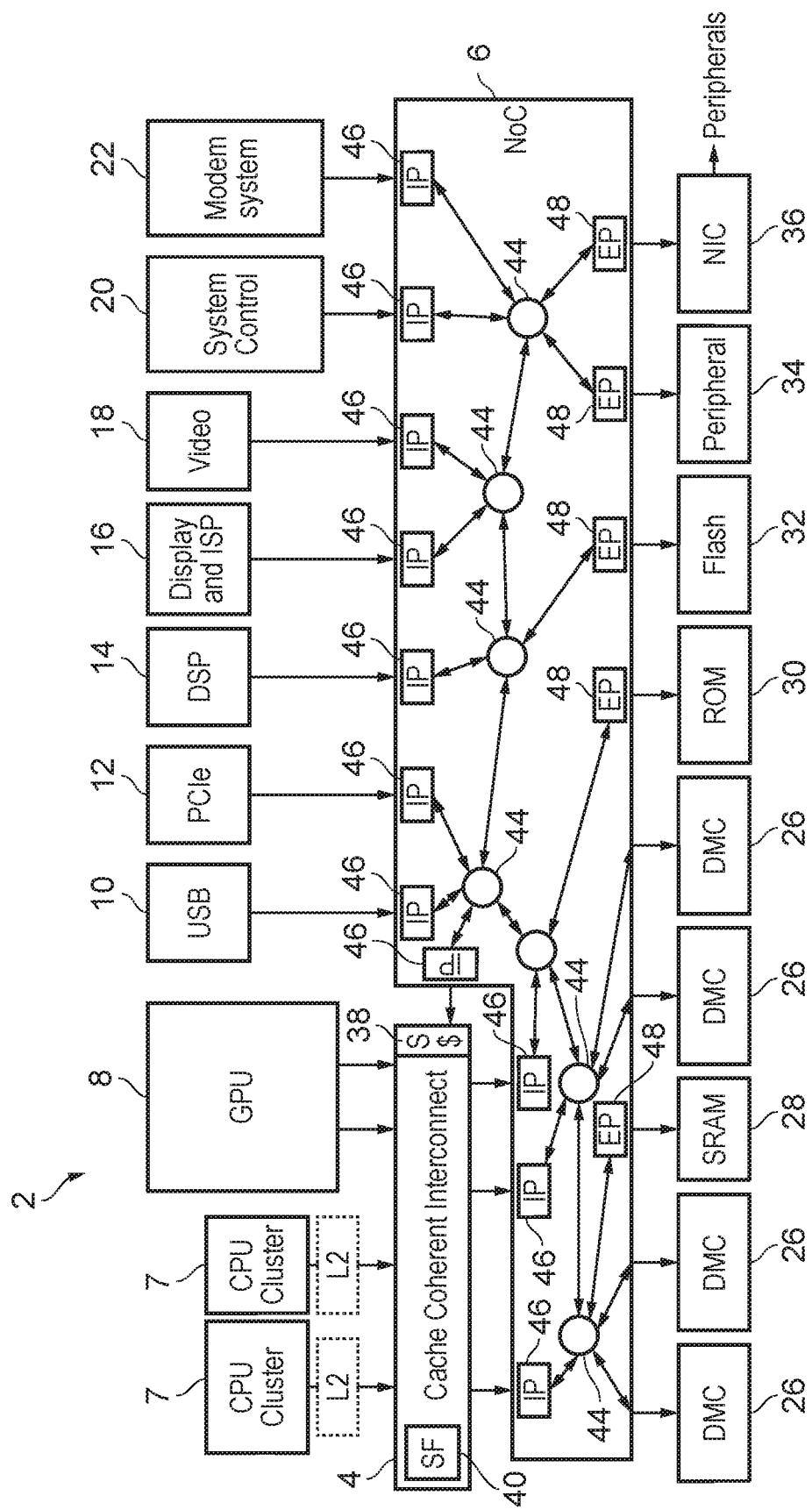
FIG. 1 shows an example of a data processing system including at least one interconnection network.

In a first example, an interconnection network for providing data transfer between a plurality of nodes of an integrated circuit comprises at least one transmission path originating from an upstream location of the interconnection network, each transmission path being arranged to transmit data blocks from the upstream location to an associated downstream location within that data path. Digest generation circuitry may be provided to generate digests for the data blocks, and fault detection circuitry may be provided in association with the upstream location, and arranged to determine the presence of a fault condition in the interconnection network. The digest generation circuitry may be arranged to generate an upstream digest for a given data block at the upstream location, and to generate a corresponding downstream digest for the given data block at the associated downstream location. The fault detection circuitry may be arranged to receive the upstream digests from the upstream location, and their corresponding downstream digests received via a return path from each downstream location, and to determine the presence of the fault condition based on a comparison of each upstream digest with its corresponding downstream digest.

Functionally correct integrated circuit designs may sometimes experience hardware faults, for example caused by an ionising particle striking a component of the circuit. If the fault occurs in the interconnection network, the fault may prevent the correct data from reaching the appropriate destination, either due to the data changing value during transmission, or due to the data being misrouted so that it does not arrive (or is delayed in arriving) at the correct destination. The faults may include hard faults, e.g. where a flip-flop or other storage element of the integrated circuit becomes stuck at a particular value regardless of the input to that storage element, causing subsequent signals dependent on that storage element to have a bit tied to '0' or '1'. Also the interconnection network could be subject to soft faults, e.g. where a bit of a transmitted value changes states during transmission due to a particle strike, but subsequently transmitted values are still correct as there was no permanent damage to the circuit hardware. In integrated circuits designed for applications where functional safety is important, such as automotive applications, it is desirable to provide mechanisms for detecting the occurrence of faults in the interconnection network.

In the present technique, fault detection is performed by comparing digests generated from a data block at different points during its transmission through the interconnection network, namely at an upstream location and a downstream location. The digests may take a number of forms. For examples the digests may be a cyclic redundancy check code generated based on the bits of the data block, or may be a copy of the data block itself. Therefore, a discrepancy between the digests indicates that a fault occurred during transmission between the upstream and downstream locations, causing at least some bits of the data block to change. Appropriate action can then be taken to account for the fault, and hence the impact of faults on a system incorporating the present technique can be reduced.

The fault detection circuitry according to the present technique is arranged in association with the upstream location, with the digest generated at the downstream location being returned to the fault detection circuitry via a return path, which can take a number of forms. The return path may be a dedicated path used for providing the downstream digests, or maybe a pre-existing path already provided for other purposes. For example, considering the example where the transmitted data block takes the form of a request being transmitted towards a slave device through the interconnection network, the return path may be a read response path used by the downstream location to return data to the upstream location in response to read requests. Hence the present technique can be applied to existing interconnect arrangements by exploiting the already available topology, and thus allows a more efficient implementation of fault detection.

Whilst in some examples the digest generation circuitry may be a single structure, in some other examples, the digest generation circuitry can comprise an upstream digest generation unit associated with the upstream location to generate upstream digests, and a downstream digest generation unit associated with each downstream location to generate corresponding downstream digests. This arrangement can improve compatibility with other operating parameters of the interconnection network, as each digest generation unit can be independently configured to operate according to the requirements of the respective upstream or downstream location.

In some examples, the fault detection circuitry incorporates a digest buffer to store each upstream digest for reference when its corresponding downstream digest is received. The present technique recognises that by storing the upstream digest locally to where it was generated, namely in association with the upstream location, and by waiting for the downstream digest to be returned via the return path to perform the fault detection also in association with the upstream location, the fault checking mechanism can be arranged to be insensitive to operating parameter differences between the upstream location and the downstream location, such as those locations being in different clock domains, and further the fault detection circuitry can be clocked asynchronously to the circuitry handling the data transmissions, simplifying physical implementation.

In some examples, fault detection may only be performed for a single in flight data block at any one time, in which case the first and downstream digests can be straightforwardly identified and compared. However, in some other examples the digest buffer can provide a tracking mechanism to associate each upstream digest with its corresponding downstream digest so that fault detection can be performed for multiple in flight data blocks at any one time.

In one example, the tracking mechanism can comprise employing a plurality of ordered entries within the digest buffer to store upstream digests generated for a plurality of data blocks transmitted via a given transmission path from the upstream location to the associated downstream location, wherein corresponding downstream digests are received by the fault detection circuitry via the return path in a same order as that which the corresponding downstream digests were generated for the plurality of data blocks. For example, the digest buffer may be a FIFO (first in first out) buffer. This arrangement provides an efficient way of associating the first and downstream digests that requires little processing power, as no proactive measures are required to associate the first and downstream digests. This arrangement is particularly suitable when the plurality of data blocks are transmitted from the upstream location to the associated downstream location without any reordering between the upstream location and the associated downstream location, as it can be safely assumed that an oldest upstream digest in the digest buffer is associated with the next downstream digest received via the return path.

In another example, the interconnection network comprises two or more transmission paths. In such a case it may not be possible to assume that the next downstream digest to be received will be associated with the oldest upstream digest in the digest buffer, as data blocks may take different amounts of time to be transmitted via different transmission paths. However, the present technique can still be applied to such an arrangement as the tracking mechanism can be arranged to associate an identifier with the upstream digest and transmit the identifier with the given data block to the associated downstream location. The digest generation circuitry can thus be arranged to return the identifier with the corresponding downstream digest to the fault detection circuitry via the return path such that the fault detection circuitry can be arranged to match the upstream digest with the corresponding downstream digest based on the identifier. Therefore, the present technique can also be implemented in an arrangement in which downstream digests are received in a different order to that which the corresponding data blocks are transmitted.

In some examples, the identifier is assigned to the upstream digest by the tracking mechanism. For example, the identifier may simply correspond to the buffer entry that the upstream digest is stored in. Alternatively, in some other examples the identifier is a data block identifier of the given data block. In either case, the present technique provides a simple way of exploiting existing elements of either the digest buffer, or the data blocks themselves, in order to associate the first and downstream digests.

In some examples, the tracking mechanism is arranged to record in the digest buffer an ordering constraint for the given data block, and when the fault detection circuitry matches the upstream digest and the corresponding downstream digest, the fault detection circuitry is further configured to determine the presence of the fault condition when the ordering constraint is not satisfied. In this manner the present technique can accommodate for interconnection networks which may not be strictly in-order but do include one or more constraints on the reordering that may take place for at least some of the data blocks transmitted via the at least one transmission path.

In some examples, a given transmission path traverses at least one domain crossing to transmit data blocks from the upstream location in a first domain to the associated downstream location in another domain. Typically such arrangements can introduce certain complexities in the handling of data transmitted between the domains, due to differing operating parameters between the first and second domains. However, the present technique recognises that a fault detection arrangement can be configured to be insensitive to such domain crossing issues by returning the downstream digest to fault detection circuitry provided in association with the upstream location and performing the fault detection in association with the upstream location. Therefore, the present technique can be more easily implemented in a larger variety of interconnection networks. For example, the present technique may be implemented in an arrangement where the first domain and the second domain are at least one of different power domains and different clock domains.

In some examples the interconnection network further comprises target indicating circuitry arranged at one of the upstream location and the associated downstream location, and configured to append a target identifier to a transmission between the upstream location and the associated downstream location, and target checking circuitry arranged at the other of the upstream location and the associated downstream location and configured to determine presence of the fault condition when the target identifier differs from a location identifier. Thus the present technique can not only detect faults where bits of a data block have erroneously changed, but can also account for the situation in which a data block is incorrectly routed to the wrong upstream or downstream location. For example, when the target identifier is indicative of the one of the upstream location and the associated downstream location at which the transmission is intended to be received and the location identifier is an identifier of the one of the upstream location and the associated downstream location at which the transmission is actually received (the location identifier may be statically or dynamically allocated to the associated upstream or downstream location), any difference between the target identifier and the location identifier will indicate that the data block has not arrived at its correct destination.

In some other examples, the target checking circuitry is provided in association with the upstream location and is arranged to maintain an indication of the associated downstream location at which the transmission is intended to be received, and the target indicating circuitry is associated with the downstream location at which the transmission is actually received and arranged to transmit as the target identifier an indication of that downstream location. In this arrangement both faults arising from a misrouted data block, and faults arising from a discrepancy between digests, are detected at the same location, namely the upstream location. Therefore, the reporting of faults can be performed in a more compact and concise manner.

In some examples, the interconnection network further comprises a plurality of endpoints to exchange data with respective nodes of the integrated circuit, wherein a source endpoint and a destination endpoint are coupled via a network route comprising the above-mentioned transmission path.

In some examples the source endpoint comprises first conversion circuitry to convert a payload of the given data block from a system protocol format to a network protocol format, and the destination endpoint comprises second conversion circuitry to convert the payload from the network protocol format to the system protocol format. In particular, this allows communications within the interconnection network to be constrained to take place in accordance with a particular network protocol format, whilst allowing different formats to be used externally to the interconnection network.

In some examples, the digest generation circuitry is arranged to generate the upstream digest at the source endpoint and the downstream digest at the destination endpoint, based on the payload in the system protocol format. In this case the conversion process between protocols is also protected by the present technique, as any errors that may occur during the conversion will be reflected by a discrepancy between the digests.

In some other examples, the digest generation circuitry is arranged to generate the upstream digest at the source endpoint and the downstream digest at the destination endpoint, based on at least the payload in the network protocol format. In this case, any internal network information that is added to the data block after conversion can also be protected, as that information will be present in the data block when either digest is generated.

In some examples, the return path is one of: a dedicated path for transmission of the corresponding downstream digest from the associated downstream location to the upstream location, and a shared path employed by the downstream location to transmit both the corresponding downstream digest and at least one other data item to the upstream location. Hence the return path can be implemented in various ways, providing better compatibility and flexibility of the present technique.

In some examples, the interconnection network further comprises a timeout monitor arranged to set a timeout limit for the downstream digest to be returned, wherein the fault detection circuitry is arranged to determine presence of the fault condition based on whether the timeout limit is exceeded. In addition to faults which cause the bits of a data block to erroneously change, transmission faults in which a data block is misrouted through the interconnection network may also occur. The present technique can be configured to detect faults of this type, hence providing more robust fault detection. For example, when an upstream digest is generated, the timeout monitor may initialise a counter. If the corresponding downstream digest is not received before the counter reaches a predetermined value, it can be assumed that the data block was misrouted.

In some examples, the interconnection network further comprises a plurality of upstream locations. In some implementations, separate fault detection units can be provided in association with each of those upstream locations. However, alternatively, the fault detection circuitry may be shared between multiple upstream locations, and configured to receive upstream digests generated at each of the plurality of upstream locations. This can reduce the overhead associated with providing the fault detection circuitry.

In some examples where the fault detection circuitry is shared between multiple upstream locations, at least one of the upstream digests is received with a global identifier indicative of which of the plurality of upstream locations the at least one upstream digest was generated at. This provides a simple mechanism for the fault detection circuitry to distinguish between the various sources of the upstream digests. In addition, the global identifier may be propagated with the transmitted data block, so that it can also be associated with the downstream digest when downstream digests is routed back to the fault detection circuitry via the return path.

In some examples, the fault detection circuitry comprises a global tracking mechanism to match upstream digests with corresponding downstream digests based on the global identifier.

When the fault detection circuitry is associated with multiple upstream locations, the physical layout may mean that the fault detection circuitry is physically closer to some upstream locations than others. In some instances, this may mean that there is a possibility that the downstream digest could be received back at the fault detection circuitry before the corresponding upstream digest has been received, for example if there is some propagation delay over the path providing the upstream digest to the fault detection circuitry. However, when the above-mentioned global identifier mechanism is used, it is still possible to effectively match upstream digests with corresponding downstream digests in such instances. In particular, if the downstream digest is received first, an entry can be made within the fault detection circuitry based on the downstream digest, which can then in due course be compared with the upstream digest when received. In either case, a timeout monitor may be implemented in this arrangement, wherein when either one of an upstream digest and a downstream digest are received by the fault detection circuitry, a timeout limit for receiving the corresponding downstream digest or upstream digest is set. If the corresponding downstream digest or upstream digest is not received within the timeout limit, a fault signal can be asserted on the assumption that an error had occurred either causing the corresponding digest to be misrouted, or causing bits of the global identifier to erroneously change, preventing the corresponding digests from being correctly matched.

Some particular examples of the present technique will now be described with reference to the figures.

FIG. 1 schematically illustrates an example of a data processing system 2 (e.g. an integrated circuit or system-on-chip) having data access routing circuitry 4, 6 for routing data access requests between requesting nodes and target nodes and routing the responses to such data access requests from the target nodes to the requesting nodes. In this example the system 2 includes a number of master devices, such as: one or more central processing units (CPUs) 7 or clusters of CPUs; a graphics processing unit (GPU) 8; a USB master 10 for controlling interaction with devices over a universal serial bus (USB); a PCIe controller 12 for controlling interaction with devices connected to the system 2 over a PCI Express bus; a digital signal processor (DSP) 14; a display controller and/or image signal processor 16; a video controller 18; a system controller 20, which could provide a number of system control functions such as controlling direct memory access operations, controlling security operations such as encryption or other on chip security operations, or controlling interaction with peripherals; and a modem system controller 22 for controlling communications via a modem. All of the masters 7 to 22 may be capable of acting as a requesting node for issuing data access requests to be serviced by a target node of the system.

The system may have a number of components which may act as target nodes, for example including a number of memory controllers 26 for controlling access to dynamic random access memory (DRAM); a memory controller 28 for controlling access to static random access memory (SRAM); a memory controller 30 for controlling access to a read only memory (ROM); a flash memory controller 32 for controlling access to flash memory; a peripheral controller 34 for controlling access to peripheral devices; and a network interface controller 36 for controlling interaction with remote devices or further peripherals via a network interface. Also the target nodes may include a system cache 38 within the data routing circuitry 4, 6, which can cache some data from the memory system 26-36 so that some data access requests can be serviced without needing to pass them on to a downstream memory component.

In the example of FIG. 1, some of the masters 7, 8 are coupled via a cache coherent interconnect 4 which is responsible for managing coherency between cached data held by the respective master's caches. The cache coherent interconnect may have a snoop filter 40 for tracking data cached in particular masters' caches and may respond to read and write data access requests specifying a target address by issuing snoop transactions to check for the coherency status of data associated with the target address cached in other masters, so that if one master requests read or write access to data, then data for the same address in another master's cache can be invalidated, or if dirty, the latest value in that other master's cache can be provided to the requesting master and/or written back to the memory system. Any known coherency protocol could be used for the cache coherent interconnect 4.

The other masters 10 to 22 (which may not comprise a cache) do not need to be connected via the cache coherent interconnect 4. A system interconnect 6 couples the outputs of the cache coherent interconnect 4 and the non-cached masters 10 to 22 with the respective destination devices 26 to 36. The system interconnect 6 is used for routing of transactions to a target node selected based on the target address specified by the request, and for routing of the responses back to the requesting node. In the arrangement shown in FIG. 1, the system interconnect 6 does not need to take responsibility for management of coherency between cache data in respective masters. However, in other examples, instead of providing a separate cache coherent interconnect 4 and system interconnect 6 as shown in FIG. 1, a single interconnect similar to the system interconnect 6 could be provided which connects each of the master and slave devices and also manages cache coherency.

In this example, the system interconnect 6 is implemented as a network on chip (NoC) which comprises a number of routers 44 for coupling a number of master interfaces 46 (from which data access requests, including read and write requests, can be received from respective master devices 7-22) to a number of target interfaces 48 (for outputting the requests to respective target devices 26-36). Each master interface 46 (also known as an ingress port, IP, or endpoint) is responsible for decoding the address specified by the data access request to identify the particular route to be taken through the network on chip 6 via the routers 44 to reach a target interface 48 associated with the selected target node which is to service the data access request. In some cases the master interface 46 may also translate the protocol used for the request asserted to the network on chip 6 into an internal representation to be used for routing the request across the network on chip 6. If the requests are translated into an internal protocol, then the target interfaces 48 (also known as egress ports, EP, or endpoints) may translate them back into the original protocol used by the request in order for servicing by the destination. Alternatively, some of the target nodes may handle the request directly in the form used by the network on chip 6 so that no translation would be needed at the target interface. For each target interface 48, when it receives the response to a data access request from the target node 26-36, the target interface 48 issues that response back along the path taken by the corresponding request to the master interface 46 which issued the request, and the master interface 46 then returns the response to the requesting node.

A network on chip 6 as shown in FIG. 1 can be useful when there are a large number of master and target/slave devices to be connected, as the arrangement of routers 44 can be designed bespoke for the requirements of a given system in order to provide for an appropriate level of bandwidth and to provide sufficient number of routers that the physical distance over which requests have to be routed on the chip can be accommodated without significant loss of signal amplitude. For pairs of requesting and target nodes which are expected to require a large amount of traffic then additional routers or signal channels can be provided between them, while other pairs of requesting/target nodes may have less capacity.

The use of a network on chip is not essential and in other examples a different topology could be used within the system interconnect 6. For example, a series of point to point connections between the master and target interfaces could be used, or a ring topology may be used in which all requests are asserted onto a ring bus and then circulate round until they reach the required target interface.

Also, a mesh topology could be used where each interface 46, 48 is connected to a point on a grid and requests and responses may traverse between the points on the grid associated with the corresponding master and target interfaces 46, 48. However, use of a network on chip can enable better scaling as the number of master and targets increases.

Although FIG. 1 shows an example of a network for routing signals between master and slave devices within an integrated circuit, in other examples the devices connected by the interconnect may not have a master-slave relationship, but instead the devices could be connected by peer-to-peer connections. Also, in some examples some requests routed by the network may target a node within the interconnect itself, such as points of coherency or caches, rather than targeting a node outside the interconnect.

The NoC 6 of FIG. 1 may include distinct sections configured to operate according to different parameters. For example, a first section of the NoC may include hardware operating according to one clock frequency, with another section including hardware operating according to a different clock frequency. Different sections may also operate at different powers. These distinct sections can be referred to as domains.

Figure 2:
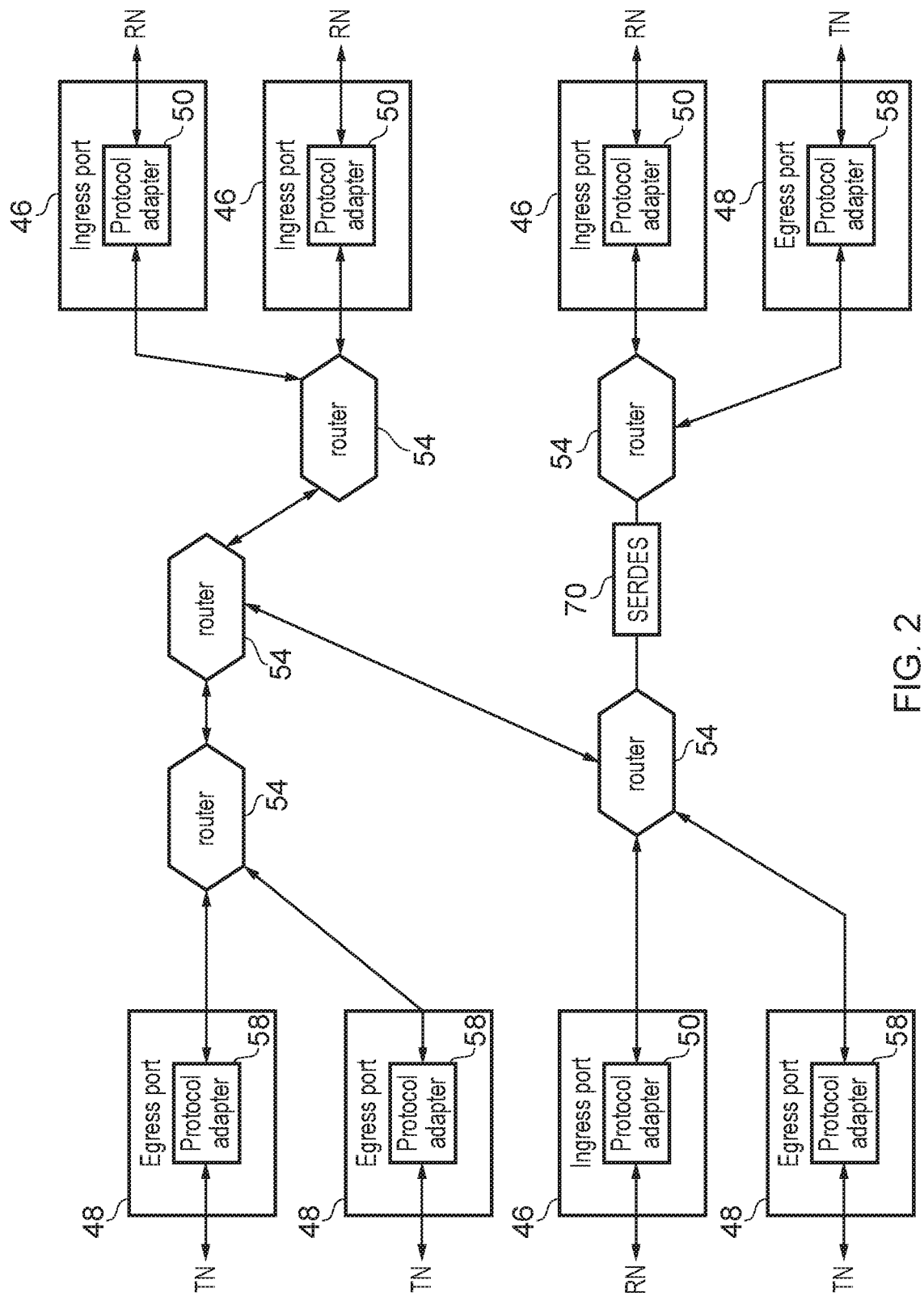
FIG. 2 shows an example of an interconnection network.

FIG. 2 shows an example of components of an example NoC 6 in more detail. The NoC 6 comprises a number of components which can be combined in different layouts and arrangements depending on the particular arrangement of master devices and target devices which are to be connected by the NoC 6. For example this may include any of the following components:

Ingress Port (Endpoint) 46

The ingress port receives data access requests from a requesting node coupled to the ingress port. For example the ingress port may act as one of the master interfaces 46 shown in FIG. 1. The ingress port 46 may decode a target address as specified by the data access request received from the requesting node to identify which egress port 48 should be selected for handling the request, and generates routing information for controlling the routing of the request across the NoC to the selected egress port 48. Also, as requests routed within the NoC 6 may use a different protocol to the protocol used by the requesting nodes for the data access requests, the ingress port may include a protocol adapter 50 for translating the request into the transport protocol used on the network. The ingress port 46 transmits the translated packets onto the network accompanied by routing information identifying how network packets corresponding to the request should be routed across the NoC. The ingress port 46 may also provide other functions such as managing resource allocation for particular requests, and controlling a quality of service level provided for requests from different sources so as to balance the competing needs of different master devices for bandwidth on the network. For example the ingress port 46 may have various buffers for buffering tracking information relating to requests and buffering responses to the requests. The ingress port 46 may control allocation of resource and issuing of requests based on availability of space in the buffers, and based on the quality of service requirements (e.g. providing a limit to the number of currently outstanding transactions that can be pending at a given time, or a limit to the number of transactions from a given requesting mode which are serviced within a given period).

Router 54

Each router 54 is responsible for routing packets received from one component of the NoC 6 and selecting which other component the packet should be directed to, based on the routing information specified by the packets which has been appended to the packet by the ingress port 46 at which the corresponding request originated. The particular arrangement and number of routers 54 that are provided may depend on the particular system requirements. For example, if ingress and egress ports are separated by a large distance on the integrated circuit then more routers may be required to provide sufficient repetition of packets to maintain signal level when the packets reach their destination. Also the topology in which the routers are connected may be selected based on expected bandwidth requirements for particular pairs of ports 46, 48.

Egress Port (Endpoint) 48

The egress port 48 receives the network packets representing data access requests that were generated by the ingress port 46 and routed across the NoC via the routers 54. The egress port 48 has a protocol adapter 58 for translating the transport protocol of the network packets back into the protocol used by the target node to which the egress report is connected. Some forms of request may not require a response from the target node. However, for requests which do require a response (e.g. a read response, a write response or both), when a response to a data access request is received from the target node which has serviced the data access request, the responses can be adapted for the transport protocol of the network by the protocol adapter 58 in the egress port 48 and then output onto the network by the egress port 48. In some cases, the response packets may be routed back to the ingress port 46 which received the original data access request which triggered those responses, e.g. along a corresponding path to the one taken by the data access request packets but in the reverse direction, or on a different path. In other cases, the response packets may be routed to a different ingress port as they may sometimes need to be provided to a different requesting node to the requesting node that issued the original request (e.g. due to a change in coherency state in the caches of the respective masters). Hence again the protocol adapter 58 may append routing information specifying the route to be taken by the response packets. When these response packets are received at the ingress port 46, the protocol adapter 50 converts them into the responses expected by the requesting nodes and forwards them onto the requesting node.

Note that in some examples the functions of the ingress/egress ports may also be handled at a network bridge component (at the boundary between two network portions), so that the network bridge may effectively act as both an ingress port and an egress port for at least some purposes.

Data Resizer 70

It may be needed to resize data values being transmitted across the network when being provided from one component to another. For example a packet comprising a smaller number of flits could be spilt into a packet comprising a greater number of flits of a smaller data size, or a packet comprising smaller flits could have flits combined or repartitioned into a smaller number of flits of greater size. If the resizing is such that the number of input flits and the number of output flits follows a many-to-one or one-to-many relationship then the resizer 70 may act as a serialiser-deserialiser (SERDES) as shown in FIG. 2. However, it is also possible for resizers to provide an M:N resizing of data flits where both N and M are greater than 1, and in this case a more general resizer may be provided to map the data associated with a certain group of input flits to the data associated with a different number of output flits. In some embodiments, it may also be possible to convert a certain number of received packets to a different number of packets to be transmitted on the remaining part of the network.

Clock Domain Crossing

Whilst not shown in FIG. 2, the NoC 6 may span multiple clock domains with components in one clock domain operating according to a clock signal which is different in one or both of the frequency and phase to the clock controlling the components in another clock domain. For example, the respective clock signals in the different clock domains could be asynchronous signals which have different clock frequencies, or could be mesochronous clock signals which have the same frequency but are offset in phase. At a clock domain boundary, the misaligned clocks mean that simply connecting the signal in the upstream domain to the corresponding signal path in the downstream domain could risk the downstream domain sampling the signal at the wrong timing relative to the clock of the source domain. A clock domain crossing component can provide buffers (one on the upstream domain side and another on the downstream domain side) for temporarily storing the transmitted information to allow the downstream domain to sample the received data at the correct timing relative to its clock. An asynchronous hand shake mechanism may be used to control the timing when data passes from the upstream buffer to the downstream buffer, so that the data can safely be transmitted over the clock domain boundary.

It will be appreciated that the network-on-chip 6 could also include other components not shown in FIG. 2.

Figure 3A:
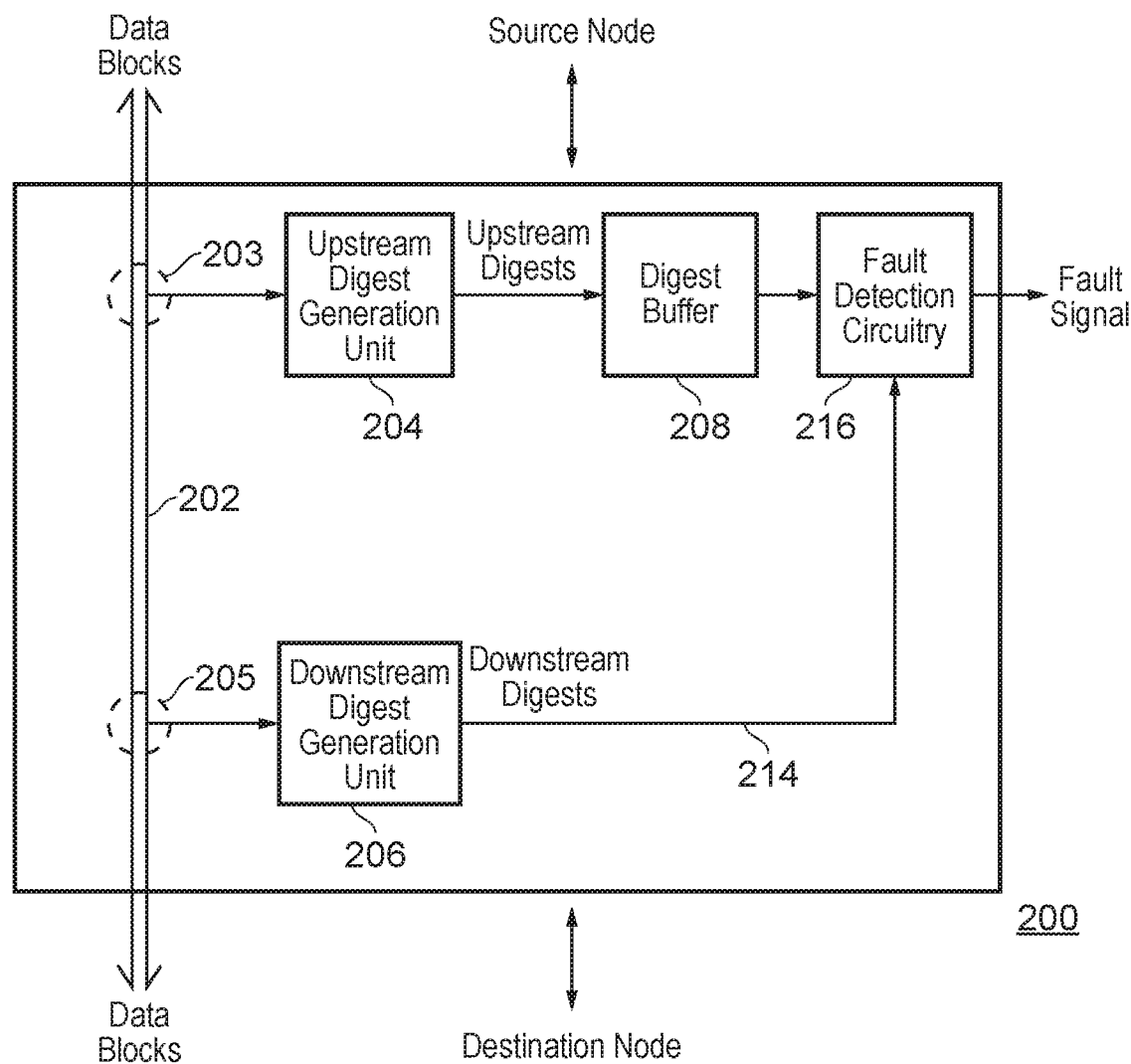
FIGS. 3A and 3B show examples of fault detection according to the present technique.

FIG. 3A illustrates one example of an interconnection network 200 according to the present technique. As can be seen, the interconnection network connects a source node and a destination node, and is arranged to transmit data blocks between the nodes via a route that includes transmission path 202. In particular, the transmission path 202 may represent the entirety of the route between the source node and the destination node, or alternatively may be just a portion of the overall route between the source and destination nodes. The type of node acting as a source node and the type of node acting as a destination node will depend on the type of transmission taking place. For instance, when performing a transaction between a master device and a slave device, there may be a number of transfers in both directions. By way of example, a request transfer may take place from the master device to the slave device, and for the transmission of the data block(s) forming that request transfer the master device is the source node and the slave device is the destination node. However, the slave device may subsequently provide a read or write response back to the master device, and for the transmission of the data block(s) forming that response transfer the slave device is the source node and the master device is the destination node.

Fault detection is implemented in the form of an upstream digest generation unit 204, a digest buffer 208 and fault detection circuitry 216 arranged in association with the upstream location 203 of the interconnection network, and a downstream digest generation unit 206 arranged in association with the downstream location 205. Erroneous changes to data blocks transmitted via the transmission path 202 are detected by comparing digests generated for a given data block, an upstream digest being generated by the upstream digest generation unit 204 at the upstream location 203, and a downstream digest being generated by the downstream digest generation unit 206 at the downstream location 205. Any information indicative of the bit values of the data block may be used as the digests. In some examples, the digests may be cyclic redundancy check (CRC) codes, generated from the bit values of a data block according to a CRC algorithm. In other examples, the digests may simply be direct copies of the data block. For any given data block, the first and downstream digests are generated at different stages of its transmission via the transmission path 202, and hence there is a temporal difference between the points in time at which each digest becomes available. Therefore, a digest buffer 208 is provided to store the upstream digest until the corresponding downstream digest has been generated and transmitted to the fault detection circuitry 216 via return path 214. Once the downstream digest is received by the fault detection circuitry 216, the upstream digest is extracted from the buffer and a comparison is performed. Any discrepancy between the first and downstream digests is indicative of the data block being corrupted at some point between the upstream location where the upstream digest was generated and the downstream location where the downstream digest was generated. A fault signal can thus be generated and appropriate action can be taken to account for the fault.

Figure 3B:
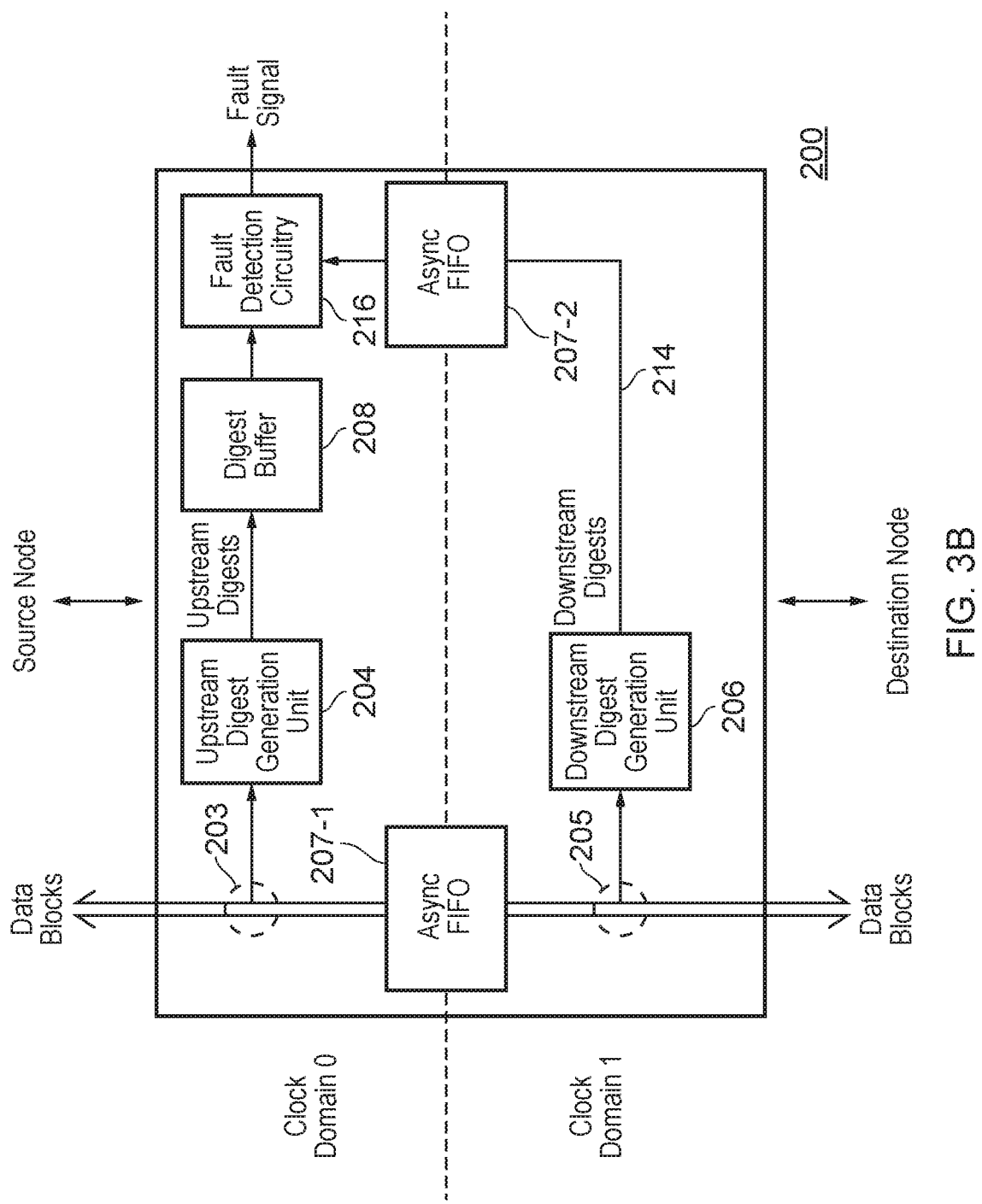

The present technique as illustrated in FIG. 3A can be insensitive to interconnection networks having two or more different domains. For example, the upstream location 203 may be in a first clock domain, and the downstream location may be in a second clock domain. One may expect this to cause timing and ordering issues, as can be the case when transmitting data across domains. However, the present technique recognises that by keeping the upstream digests at the upstream location, and hence in the domain which they were generated, and also performing the digest comparison at the upstream location, fewer issues related to timing and ordering with respect to the downstream digest arise. As a result, it is possible to implement the present technique at the peripheries of an interconnection network, with the upstream location 203 corresponding to one of an ingress port and an egress port of the interconnection network, and the downstream location corresponding to the other one of an ingress port and an egress port for example. Alternatively, the present technique may also be implemented across smaller error prone regions of an interconnection network, such as in association with a clock domain crossing. An example of such an arrangement is shown in FIG. 3B. As can be seen from FIG. 3B, the upstream location 203 and the downstream location 205 are arranged at either side of an asynchronous FIFO 207-1, which bridges clock domain 0 and clock domain 1 Similarly, the downstream digests are returned to the fault detection circuitry via asynchronous FIFO 207-2. By virtue of the asynchronous FIFOs, it can be assumed that no reordering of data blocks, or downstream digests, will occur during transmission across the clock domain. Therefore, the elements of the present technique arranged in clock domain 0, namely the upstream digest generation unit 204, digest buffer 208, and the fault detection circuitry 216 need not account for the difference in clock speed/operating frequency of components operating in clock domain 1, such as the downstream digest generation unit 206.

Figure 4:
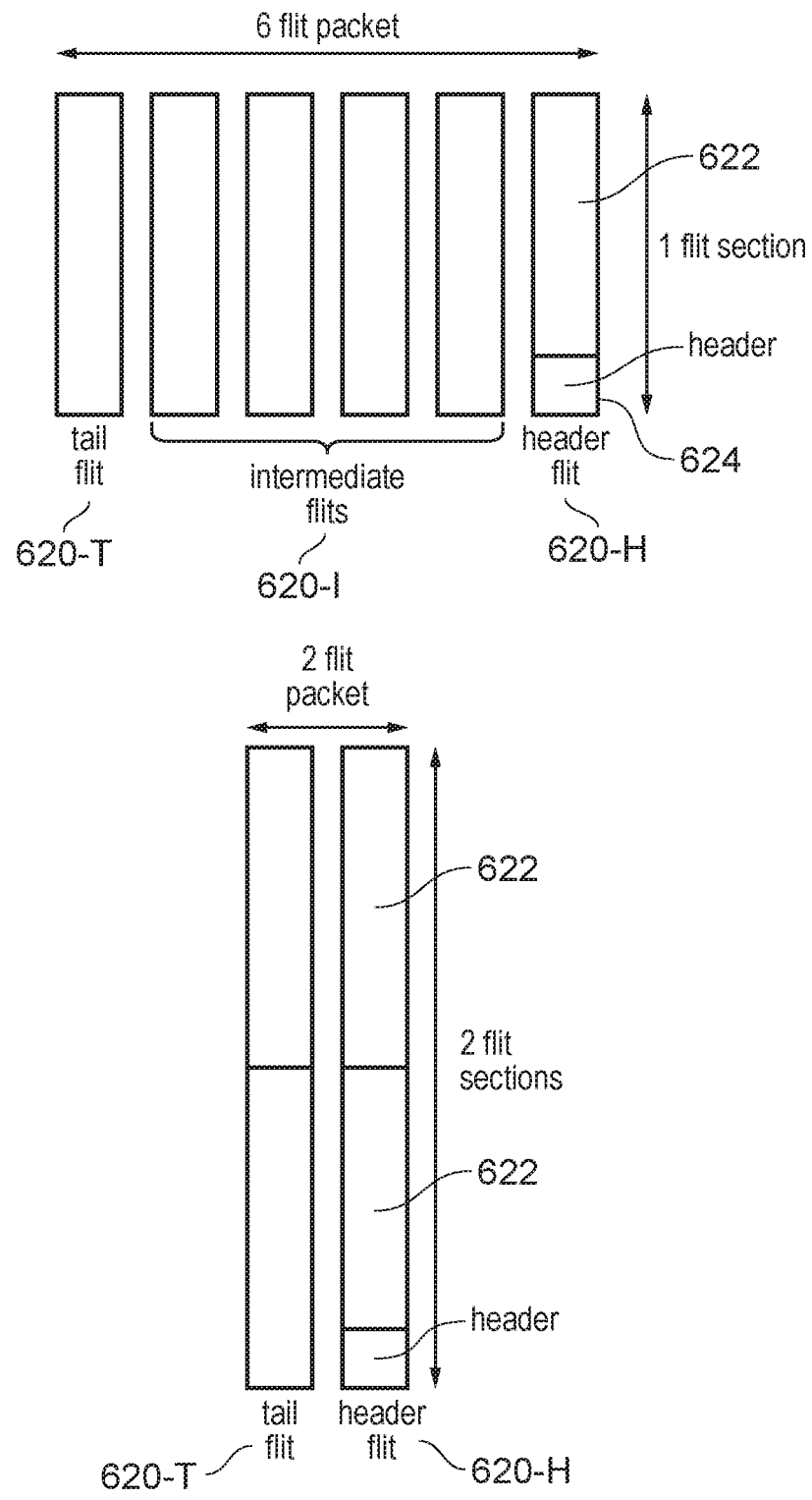
FIG. 4 shows an example of data packets with variable formats.

FIG. 4 illustrates a packet format, which may be adopted by the network protocol of an interconnection network to transmit data packets of variable size and format. A data packet is a unit of data generated from a source node. Each packet may have a separate header providing information about the format of the packet. The packet may be formed of one or more flits (or flow control digits) 620. A flit is the smallest unit of data for which routing and/or flow control of the flit through the network can be controlled independently of routing of other flits. For example, the network may include mechanisms to delay transmission of the next flit if there is no room in a downstream component to accept the flit.

Each flit 620 may be formed from one or more flit sections 622 of a given base unit size. Hence the size of each flit 620 is variable. FIG. 4 shows two examples of possible packet formations. The upper example shows a packet with flits 620 comprising a single flit section 622. The lower example provides flits 620 with two flit sections 622. Providing a variable size of flit can be useful for enabling different parts of the network to use physical channels of different bit widths. This can be useful for allowing some portions of the network which are expected to require a high volume of traffic to be made with wider physical channels than less intensively used portions of the network. This can also be useful for handling cases where different ingress/egress ports may have different sized interfaces with a corresponding node of the integrated circuit 2. For example, some upstream or downstream components may require data to be provided over a wider or narrower channel. Hence, by varying the number of flits per packet based on the size of the data received from the source node or to be transmitted to the destination node, this enables the overall packet size to be increased or decreased as required.

In packet formats having a single flit, that flit 620 acts as a header flit 620-H comprising packet header information 624 identifying the format of the packet. The header flit may comprise one or more flit sections 622 (including the first flit section specifying the header), which may provide further payload data. For packets comprising multiple flits 620, the packet includes at least a header flit 620-H and a tail flit 620-T. If the packet comprises more than two flits, then the packet also includes one or more intermediate flits 620-I. The intermediate flits 620-I or tail flits 620-T allow the packet to provide additional data following the header flit 620-H. Regardless of the packet format, the header 624 specifies information for controlling routing of the packet, e.g. identifying the destination endpoint and route. In some examples, the header 124 could also define information indicating the format of the packet, e.g. the number of flits and/or number of flit sections per flit. However, in other examples the number of flits could be specified instead by a flag included in the tail flit 120-T to indicate that the tail flit 120-T is the final flit of the packet. The number of flit sections per flit may be specified in PHY layer signals associated with each flit.

Also, the packet may specify flit validity information indicating which of the flit sections 622 of the respective flits 620 contain valid data. The flit validity information for the packet could be specified in the packet header 624, or alternatively flit validity information relating to a particular flit can be specified within that flit itself. Depending on the way in which the packet is assembled at the protocol adapter (or at data resizers 70), some of the flit sections may not comprise any valid data. Optionally, invalid flit sections 622 may be discarded partway across the network by data resizers 70 if necessary. The data resizer 70 may be responsible for any changes of packet format required at intermediate points at the network in order to adapt the packet format used by one part of the network to a different packet format used in another part of the network.

In addition to physical layer signals specifying the format of the packets, the header 624 could also include link layer signals which specify information for controlling the routing of the packets across the network, for example including a route vector for identifying the sequence of routers 54 to be traversed, identifiers of the source endpoint and destination endpoint between which the packet is routed, and/or quality of service information which may flow control (e.g. affecting arbitration or prioritisation between different packets competing for bandwidth on the network).

While in FIG. 4, the header 624 is for conciseness shown solely in the header flit 620-H, in some cases some of the header information could also be provided in each subsequent flit to indicate properties of that flit.

Figure 5:
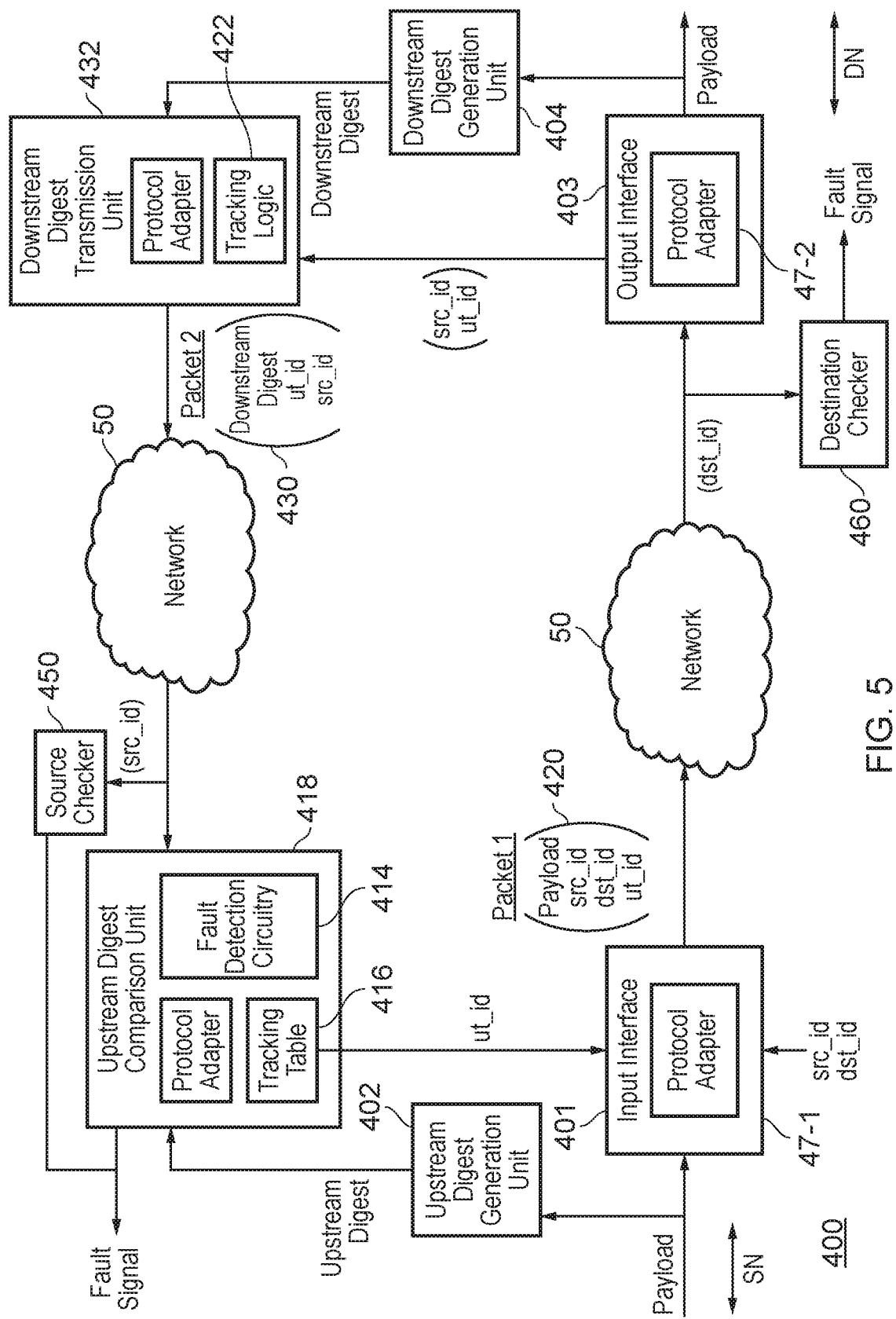
FIG. 5 shows another example of fault detection in an interconnection network according to the present technique.

FIG. 5 shows another example of an interconnection network 400 according to the present technique. The interconnection network 400 includes the same core fault detection elements as that of FIG. 3, in that an upstream digest is generated at an upstream location, and then compared to a downstream digest from a downstream location to determine whether a fault has occurred. However, the fault detection mechanism in FIG. 5 is implemented across a much larger scale than that of FIG. 3, with the upstream digest generation unit 402 and the downstream digest generation unit 404 being arranged to encompass an input interface 401 (one of an ingress port 46 and an egress port 48 depending on which node is the source), an output interface 403 (one of an egress port and an ingress port) and the network 50 connecting them. The input interface 401, network 50 and output interface 403 are arranged to transmit payloads, which may be transfer requests or transfer responses for example, between masters and slaves. Therefore, should a fault occur when a payload is handled by any of these elements it can be detected in accordance with the present technique.

As can be seen from FIG. 5, when a payload is received by the input interface 401 from a source node, the upstream digest generation unit generates an upstream digest from the payload. The upstream digest is then stored in the tracking table 416 of the upstream digest comparison unit 418. Unlike the example of FIG. 3, it cannot be assumed that a series of payloads will be transmitted from the input interface 401 to the output interface 403 in an in-order fashion, as some payloads may take a shorter path in the network 50 than others. Therefore, to accommodate for any reordering that may occur in the network 50, the tracking table 416 is arranged to record an identifier (ut_id) with each of the upstream digests. The ut_id is also made available to the input interface 401, which appends it to data packet 1 including the payload for transmission. When packet 1 420 is received by the output interface 403, the data block is provided to the downstream digest generation unit, whilst the ut_id is provided to tracking logic 422, such that it can be appended to the downstream digest in data packet 2 430, which is then returned upstream. When packet 2 is received by the upstream digest comparison unit 418, the ut_id can be used to match the downstream digest to the associated upstream digest stored in the tracking table. The fault detection circuitry 414 can then determine whether there is any discrepancy between the digests and assert the fault signal accordingly.

Each of the input interface 401 and output interface 403 include a protocol adapter 47 for converting data blocks between the network protocol and the system protocol. In the example of FIG. 5, it can be seen that the digests are generated on the basis of the data blocks in the system protocol. As such, any errors that may occur during protocol translation by either of the protocol adapters 47-1 will be reflected by a discrepancy between the digests. On the other hand, in other examples the digest generation units may be arranged between the input interface 401 and the output interface 403, such that digests are generated on the basis of data packets in the network protocol. In this way, internal information such as the source id, destination id and ut_id can also be protected by the fault detection.

The interconnection network 400 includes an additional fault detection mechanism, in the form a source checker 450 and a destination checker 460. As can be seen, the input interface is configured to include a destination id (dst_id) and a source id (src_id) in packet 1, with src_id being indicative of the source node generating the payload, and dst_id being indicative of the destination node for the payload. Therefore, when a data packet is received downstream, the destination checker 460 may compare dst_id with a static destination indicator for the destination node associated with the output interface, in order to determine whether the packet was correctly routed through the network 50. A similar check may be performed by source checker 450, by ensuring that the downstream digest transmission unit 432 includes within packet 2 the src_id information provided with the original transmission from the source, enabling the src_id of any packets returned upstream to be compared with a static source indicator for the source node associated with the input interface.

The ut_id identifier is also appended to the payload for which the upstream digest was generated, so that when the downstream digest is subsequently generated, and returned to the upstream location, the ut_id identifier can also be returned, and the downstream digest can be matched to the corresponding upstream digest.

FIG. 6 shows an example of the tracking table 416 in more detail. As can be seen, each entry of the tracking table is identified by its ut_id. When an upstream digest, such as a CRC code, is stored in the tracking table 416, the ut_id of the entry can be transmitted to the input interface in the manner described with reference to FIG. 5. The tracking table 416 is also configured to maintain a time out counter for each upstream digest. When an upstream digest is stored in the tracking table 416, a timer may begin, and if the associated downstream digest is not received before the timer reaches a timeout threshold, the fault signal may be asserted. In this manner if a payload is incorrectly misrouted through the network 50, and hence a downstream digest is never received, the upstream digest will not indefinitely occupy space in the tracking table.

The tracking table 416 may be further configured to maintain some ordering information, such that any necessary ordering constraints can be maintained. For example, despite a degree of reordering being possible within the network 50, a system may be employed such that certain events must not occur prior to others. As such, the ordering information may be used to determine whether a downstream digest has been received earlier than expected with respect to the pending upstream digests in the tracking table 416. Should this occur, it can be determined whether any illegal reordering has occurred, and a fault signal can be asserted accordingly.

As an alternative to providing the destination checker 460 at the downstream location, the tracking table may optionally be arranged to record the dst_id corresponding to the payload for which each upstream digest is generated. Then instead of comparing the dst_id with the static destination id at the destination checker, the output interface and downstream digest transmission unit 432 can be configured to return the dst_id in packet 2 for checking against the dst_id in the tracking table 416. Any discrepancy indicates that either a different packet has been erroneously identified as packet 1, or that the wrong destination received packet 1 and generated the digest returned as packet 2, and hence in either case the fault signal is asserted.

FIG. 7 illustrates some different examples faults that can be detected by the present technique:

Corruption

When one or more bits of a data packet flips at a transmission stage between the upstream location where the upstream digest is generated, and the downstream location where the downstream digest is generated, this bit flip will be reflected by a discrepancy between the first and downstream digests. As such, upon the fault detection circuitry comparing the digests, a mismatch will be spotted, and the fault signal can be asserted.

Repetition of Data

When a packet is transmitted in multiple flits, one flit may be erroneously duplicated, and transmitted two or more times. When duplication occurs between the digest generation locations, this will also be reflected by a discrepancy between the digests.

Deletion of Data

If one or more flits are erroneously deleted from a packet, then similar to the previous examples, a discrepancy between digests will be noticed. On the other hand, if an entire packet is deleted, then once the entry comprising the upstream digest in the tracking table times-out, it can be assumed that the data packet was erroneously deleted in the network. As another alternative, one or more bits of the destination identifier information may be deleted/altered, for example due to a soft fault, which may result in due course in a mismatch of destination identifiers.

Insertion of Data

If one or more flits are erroneously added to a packet, then similar to the previous examples, a discrepancy between the digests will be noticed.

Sequencing Error

As described with reference to FIG. 6, the tracking table may maintain ordering information in relation to the upstream digests pending in the tracking table. When packets are delivered to the output interface in the wrong order, the downstream digests will also be generated and returned to the upstream digest comparison unit in the wrong order. When the order in which the downstream digests are returned conflicts with the ordering information in the tracking table, the fault signal can be asserted. Alternatively, in an in ordered system, it can be assumed that any downstream digests received at the upstream digest comparison unit should be associated with the oldest upstream digest in the tracking table, and a comparison can be performed based on this assumption. It follows that if the downstream digests are instead erroneously returned in an out of order fashion, but comparisons are still performed on this basis, then the digests will not match.

Delays

As described with reference to the tracking table in FIG. 6, a timeout counter may be started for a payload when its corresponding upstream digest is stored in the tracking table. Should the associated downstream digest take longer than the predetermined amount of time to be returned to the fault detection circuitry, then it can be assumed that an erroneous delay has occurred, and the fault signal can be asserted.

Masquerading Transmitters

As described with reference to FIG. 5, the source checker 450 and destination checker 460 are arranged to determine when a payload or downstream digest is misrouted in the network 50. As such, when a packet is erroneously received at either the upstream digest comparison unit 418, or the output interface 403, this can be detected by the source checker 450 or destination checker 460 respectively, and a fault signal can be asserted. Alternatively, if a downstream digest is expected to be received according to the tracking table 414, but is not subsequently received within a predetermined amount of time because it has been misrouted in the network 50, then a timeout will occur and a fault signal can be asserted. Even in examples where a source checker and a destination checker are not provided, fault signals can still be asserted based on misrouted digests because it is highly unlikely that any erroneously received downstream digest will match the upstream digest that it is compared to.

Figure 8:
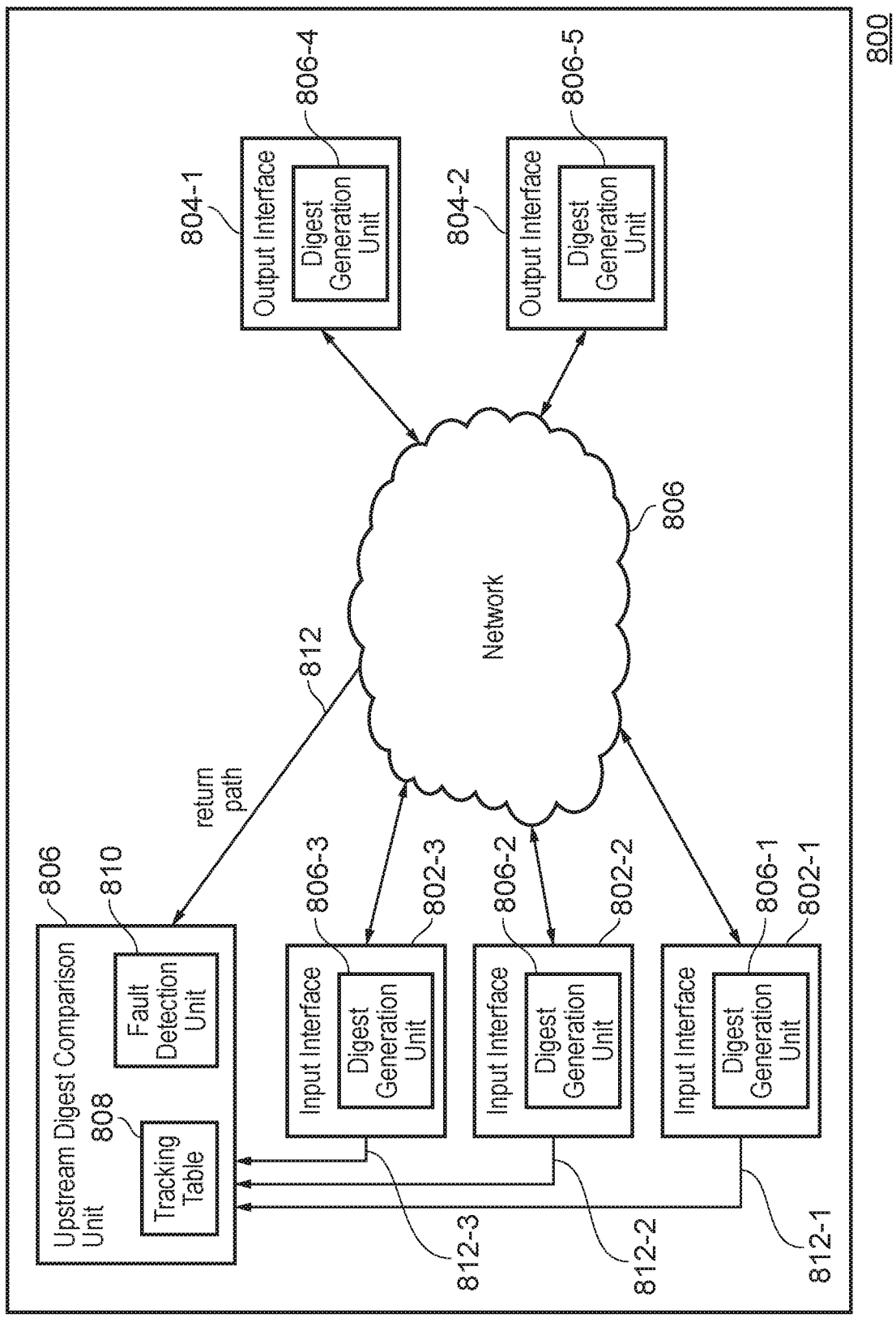
FIG. 8 shows another example of fault detection in an interconnection network according to the present technique.

FIG. 8 shows another example of fault detection according to the present technique. The interconnection network includes three input interfaces 802, and two output interfaces 804, which are connected by the network 806, via which data packets are transmitted between the interfaces. As can be seen from FIG. 8, each input interface 802 is arranged with its own digest generation unit 806, but is coupled to a common upstream digest comparison unit 806 via a corresponding dedicated path 812. Similarly, each output interface 804 also has its own digest generation unit 806, and is coupled to the upstream digest comparison unit 806 via the return path 812 (it should be noted that there may be multiple return paths but only one is shown in FIG. 8 for simplicity). Therefore, when an upstream digest is generated for data transmitted by any of the input interfaces, it will be stored in the tracking table 808 with a global identifier indicating which input interface the upstream digest originated from. The global identifier is also transmitted downstream to the relevant output interface 804, and returned upstream with the downstream digest once it has been generated. Thus when the downstream digest is received by the upstream digest comparison unit it can be matched to the corresponding upstream digest on the basis of the global identifier, and a comparison between the digests can be performed by the fault detection unit in order to determine if a fault has occurred. Should any discrepancy between the two digests exist, a fault signal can be asserted.

When the fault detection circuitry 810 is associated with multiple upstream locations, as per the example of FIG. 8, the physical layout may mean that the fault detection circuitry is physically closer to some upstream locations than others. In some instances, this may mean that there is a possibility that the downstream digest could be received back at the fault detection circuitry before the corresponding upstream digest has been received, for example if there is some propagation delay over the path providing the upstream digest to the fault detection circuitry. However, when the above-mentioned global identifier mechanism is used, it is still possible to effectively match upstream digests with corresponding downstream digests in such instances. In particular, if the downstream digest is received first, an entry can be made within the tracking table 808 based on the downstream digest, which can then in due course be compared with the upstream digest when received. In addition, as each of the input interfaces 802 are to some extent separated from the upstream digest comparison unit, the example of FIG. 8 includes the dedicated paths 812, which are independent to the network 806, for transmitting the upstream digests to the upstream digest comparison unit 806. In this way, the transmission of the upstream digests to the digest comparison unit will not be exposed to any errors that occur to transmissions in the network 806. The dedicated paths 812 may be formed in a variety of ways, for example by provision of redundant paths within the interconnection network of FIG. 8.

A timeout monitor may be implemented in this arrangement, such that when whichever one of an upstream digest and an associated downstream digest is received first by the fault detection circuitry, a timeout limit for receiving the corresponding downstream digest or upstream digest is set. If the corresponding downstream digest or upstream digest is not received within the timeout limit, a fault signal can be asserted on the assumption that an error had occurred either causing the corresponding digest to be misrouted, or causing bits of the global identifier to erroneously change, preventing the corresponding digests from being correctly matched.

Figure 9:
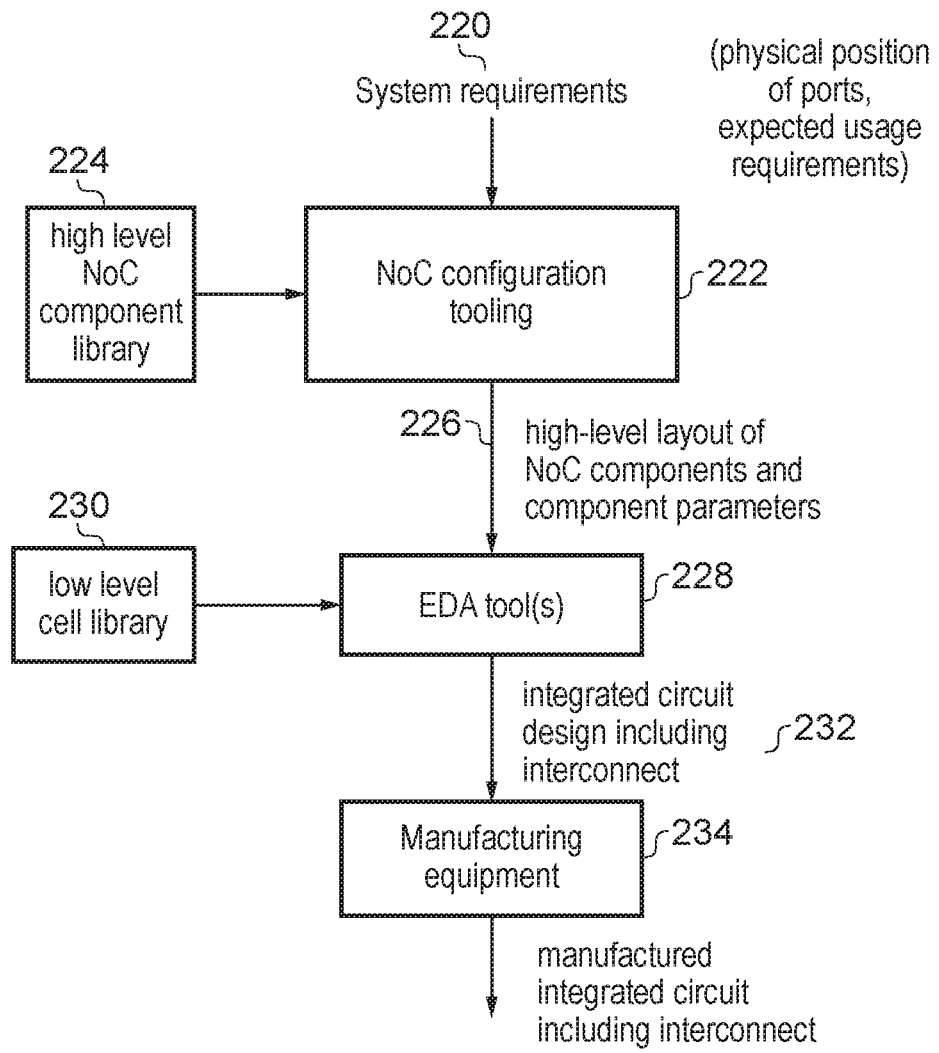
FIG. 9 schematically illustrates design and manufacture of an integrated circuit including an interconnection network.

FIG. 9 schematically illustrates an example of an electronic design process which may use automated design techniques to simplify the design process. A system designer or an electronic design tool performing an earlier stage of the design process may specify various system requirements 220, such as the physical position of the ports 46, 48 to be used for the integrated circuits interconnect, and/or expected usage requirements (e.g. which pairs of ports are likely to require communication links between them and the expected level of bandwidth for different pairs of ports depending on expected data traffic or prioritisation of different masters relative to each other). A NoC configuration tooling program 222 executed on a data processing apparatus may use the system requirements, together with a component library 224 providing a high level representation of the various NoC components which can be selected for assembling the NoC, to generate an electronic design file 226 which provides a high level layout of the NoC components and specifies various parameters of those components such as parameters for configuring the particular properties of the components.

For example, the component library 224 could specify a range of components, such as the ingress port 46, egress port 48, routers 54, or resizers 70 as discussed above with respect to FIG. 2. For some of these types of component, multiple alternative types could be specified in the component library for selection depending on the particular needs of the system requirements. Alternatively a single type of component could be provided but the NoC configuration tooling 222 may specify, as properties of a given component, certain variables which may tune behaviour of a given component of the NoC or control how that component is manufactured. For example, the parameters for an ingress port could specify the size of the interface with the corresponding requesting node, a subset of destination ports for which routing of network traffic is expected to be needed, a packet format to be used for packets routed to particular destinations, etc. The NoC configuration tooling 222 may determine such requirements based on the system requirements that were input. Part of the NoC configuration function may be to lay out the high level configuration of the additional components to be provided for functional safety checking in association with the ingress and egress ports, such as the check code generation components and the error checking components discussed earlier. For example, a special "functional safety providing" version of the ingress port 46 and egress port 48 may be selected (as opposed to alternative versions of the ingress port 46 and egress port 48 which may be selected when generating a NoC design for a system not requiring functional safety). Similar decisions could be activated for other network components, depending on the level of functional safety specified as being required in the system requirements 220.

The high level layout file 226 generated by the NoC configuration tooling 222 is provided to an electronic design automation (EDA) tool 228 which uses a low level cell library 230 specifying standard cells of integrated circuit components at a more detailed level than the NoC component library 224, and generates an integrated circuit design file 232 which specifies the particular gates or transistors to be generated for the integrated circuit which includes the interconnect designed by the NOC configuration tooling 222. In some cases the EDA 228 may actually comprise a number of tools which gradually iterate the design to produce more and more detailed circuit-level representations. The EDA tools 228 may also carry out timing analysis to check whether the designed circuit would meet its timing requirements (testing for setup and hold violations for example), and may iterate the design if earlier attempts fail the timing analysis. The eventually prepared integrated circuit design represented by the design file 232 is then provided to a manufacturer who uses the design file to control manufacturing equipment 234 to manufacture the integrated circuit with the required connections between transistors in order to implement an integrated circuit including the interconnect.

Figure 10:
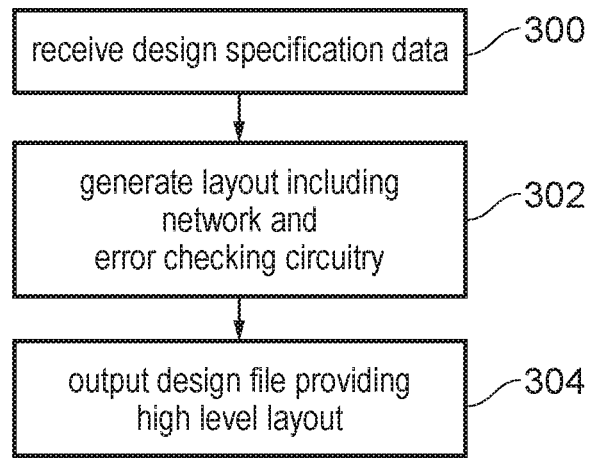
FIG. 10 is a flow diagram illustrating a method of generating an electronic design file representing a design of an interconnection network.

FIG. 10 shows a flow diagram illustrating a method of generating an electronic design file representing a design of an interconnection network, such as the system interconnect (NoC) 6 discussed above. At step 300 the system tooling is provided with design specification data defining the properties of the interconnection network to be generated. For example the design specification data may specify the number of nodes to be connected using the network, the data width of the channels used by each of those nodes, expected usage requirements (such as levels of service or bandwidth required for particular combinations of requesting node and destination node) and the level of functional safety required (e.g. specifying one of the ASIL functional safety classifications required, e.g. level C or level D). In response to the design specification data, at step 302 the system tooling 222 generates a high level layout for the network, e.g. including an arrangement of routers, resizers or other components defining the primary network so as to provide the requirements specified by the design specification data. The design may include components which provide the logic for generating and checking the error check codes as discussed above (either explicitly in the high-level layout information 226 generated by the tooling, or implicitly in the sense that the selected cell type specified in the high-level layout corresponds to a cell in the cell library 230 which has been given an integrated circuit design which will implement these functional safety features). The high level layout specifies the components to be generated at a relatively abstract level, for example merely specifying identifiers of the cell type to be provided and optionally one or more configuration parameters for adjusting properties of that component, but not necessarily specifying the exact transistor level layout to be generated for that component. At step 304 the design file identifying the high level layout is output. This could then be input to an EDA tool 228 using a standard cell library 230 to provide the specific gate-level design for each of the high level components indicated by the system tooling 222 in the design file 228, to generate the specific integrated circuit design 232 which can then be used for manufacturing the circuit.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An interconnection network for providing data transfer between a plurality of nodes of an integrated circuit, comprising:
 a plurality of transmission paths originating from an upstream location of the interconnection network, each transmission path being arranged to transmit data blocks from the upstream location to an associated downstream location within that transmission path;
 digest generation circuitry to generate digests for data blocks; and
 fault detection circuitry provided locally to the upstream location and arranged to determine presence of a fault condition in the interconnection network; wherein
 the digest generation circuitry is arranged to generate an upstream digest for a given data block at the upstream location, and to generate a corresponding downstream digest for the given data block at the associated downstream location;
 the fault detection circuitry is arranged to receive upstream digests from the upstream location and corresponding downstream digests received via a return path from each downstream location, and to determine presence of the fault condition based on a comparison of each upstream digest with its corresponding downstream digest; and
 the fault detection circuitry incorporates a digest buffer with a plurality of entries to store each upstream digest for reference when its corresponding downstream digest is received.

2. The interconnection network according to claim 1, wherein the digest generation circuitry comprises an upstream digest generation unit associated with the upstream location to generate upstream digests, and a downstream digest generation unit associated with each downstream location to generate corresponding downstream digests.

3. The interconnection network according to claim 1, wherein the digest buffer provides a tracking mechanism to associate each upstream digest with its corresponding downstream digest.

4. The interconnection network according to claim 3, wherein the tracking mechanism comprises employing a plurality of ordered entries within the digest buffer to store upstream digests generated for a plurality of data blocks transmitted via a given transmission path from the upstream location to the associated downstream location, wherein corresponding downstream digests are received by the fault detection circuitry via the return path in a same order as the corresponding downstream digests were generated for the plurality of data blocks.

5. The interconnection network according to claim 4, wherein the plurality of data blocks are transmitted from the upstream location to the associated downstream location without any reordering between the upstream location and the associated downstream location.

6. The interconnection network according to claim 3, wherein:
 the tracking mechanism is arranged to associate an identifier with the upstream digest and transmit the identifier with the given data block to the associated downstream location;
 the digest generation circuitry is arranged to return the identifier with the corresponding downstream digest to the fault detection circuitry via the return path; and
 the fault detection circuitry is arranged to match the upstream digest with the corresponding downstream digest based on the identifier.

7. The interconnect network according to claim 6, wherein the identifier is assigned to the upstream digest by the tracking mechanism.

8. The interconnect according to claim 6, wherein the identifier is a data block identifier of the given data block.

9. The interconnect according to claim 6, wherein the tracking mechanism is arranged to record in the digest buffer an ordering constraint for the given data block, and when the fault detection circuitry matches the upstream digest and the corresponding downstream digest, the fault detection circuitry is further configured to determine the presence of the fault condition when the ordering constraint is unsatisfied.

10. The interconnection network according to claim 1, wherein a given transmission path traverses at least one domain crossing to transmit data blocks from the upstream location in a first domain to the associated downstream location in another domain.

11. The interconnection network according to claim 10, wherein the first domain and the second domain are at least one of:

different power domains, and
different clock domains.

12. The interconnection network according to claim 1, further comprising:
   target indicating circuitry arranged at one of the upstream location and the associated downstream location, and configured to append a target identifier to a transmission between the upstream location and the associated downstream location; and
   target checking circuitry arranged at the other of the upstream location and the associated downstream location and configured to determine presence of the fault condition when the target identifier differs from a location identifier.

13. The interconnection network according to claim 12, wherein the target identifier is indicative of the one of the upstream location and the associated downstream location at which the transmission is intended to be received and the location identifier is an identifier of the one of the upstream location and the associated downstream location at which the transmission is actually received.

14. The interconnection network according to claim 12, wherein the target checking circuitry is provided in association with the upstream location and is arranged to maintain an indication of the associated downstream location at which the transmission is intended to be received, and the target indicating circuitry is associated with the downstream location at which the transmission is actually received and arranged to transmit as the target identifier an indication of that downstream location.

15. The interconnection network according to claim 1, further comprising a plurality of endpoints to exchange data with respective nodes of the integrated circuit, wherein a source endpoint and a destination endpoint are coupled via a network route comprising the transmission path.

16. The interconnection network according to claim 15 wherein:
   the source endpoint comprises first conversion circuitry to convert a payload of the given data block from a system protocol format to a network protocol format, and
   the destination endpoint comprises second conversion circuitry to convert the payload from the network protocol format to the system protocol format.

17. A method for providing data access between nodes of an integrated circuitry using an interconnection network comprising a plurality of transmission paths originating from an upstream location of the interconnection network, each transmission path being arranged to transmit data blocks from the upstream location to an associated downstream location within that transmission path, the method comprising:
   generating digests for data blocks; and
   determining, using fault detection circuitry provided locally to the upstream location, presence of a fault condition in the interconnection network; wherein
   the step of generating digests comprises generating an upstream digest for a given data block at the upstream location, and generating a corresponding downstream digest for the given data block at the associated downstream location;
   the determining step comprises receiving digests from the upstream location and receiving corresponding downstream digests via a return path from each downstream location, and determining presence of the fault condition based on a comparison of each upstream digest with its corresponding downstream digest; and
   storing each upstream digest in a digest buffer with a plurality of entries for reference when its corresponding downstream digest is received.

18. A computer-implemented method of generating an electronic design file representing a design of an interconnection network for providing data transfer between nodes of an integrated circuit, the method comprising:
   in response to design specification data identifying the nodes to be connected by the interconnection network, generating the electronic design file specifying that the interconnection network comprises:
   a plurality of transmission paths originating from an upstream location of the interconnection network, each transmission path being arranged to transmit data blocks from the upstream location to an associated downstream location within that transmission path;
   digest generation circuitry to generate digests for data blocks; and
   fault detection circuitry provided locally to the upstream location and arranged to determine presence of a fault condition in the interconnection network; wherein
   the digest generation circuitry is arranged to generate an upstream digest for a given data block at the upstream location, and to generate a corresponding downstream digest for the given data block at the associated downstream location;
   the fault detection circuitry is arranged to receive upstream digests from the upstream location and corresponding downstream digests received via a return path from each downstream location, and to determine presence of the fault condition based on a comparison of each upstream digest with its corresponding downstream digest; and
   the fault detection circuitry incorporates a digest buffer with a plurality of entries to store each upstream digest for reference when its corresponding downstream digest is received.

19. A non-transitory storage medium storing a computer program for controlling a data processing apparatus to perform the method of claim 18.

* * * * *